| United States Patent [19] | [11] | 4,113,631 |
|---|---|---|
| Thompson | [45] | Sep. 12, 1978 |

[54] FOAMING AND SILT SUSPENDING AGENT

[75] Inventor: James L. Thompson, Tulsa, Okla.

[73] Assignee: The Dow Chemical Company, Midland, Mich.

[21] Appl. No.: 713,168

[22] Filed: Aug. 10, 1976

[51] Int. Cl.$^2$ .................. E21B 43/27; E21B 43/26
[52] U.S. Cl. .................. 252/8.55 C; 166/307; 166/308; 252/8.55 R
[58] Field of Search .............. 252/8.55 R, 8.55 C, 252/106, 547, 8.55 B; 166/307, 308, 309

[56] References Cited

U.S. PATENT DOCUMENTS

| 2,169,976 | 8/1939 | Guenther et al. .................. 260/561 |
| 2,717,876 | 9/1955 | Menaul .................. 252/8.55 |
| 3,111,178 | 11/1963 | Marsh et al. .................. 166/309 |
| 3,223,647 | 12/1965 | Drew et al. .................. 252/547 X |
| 3,296,145 | 1/1967 | Findlan et al. .................. 252/106 |
| 3,303,896 | 2/1967 | Tillotson et al. .................. 166/309 X |
| 3,317,430 | 5/1967 | Priestley et al. .................. 252/547 |
| 3,324,183 | 6/1967 | Priestley .................. 252/547 X |
| 3,382,924 | 5/1968 | Veley et al. .................. 252/8.55 X |
| 3,937,283 | 2/1976 | Blauer et al. .................. 166/307 |
| 3,980,136 | 9/1976 | Plummer et al. .................. 166/308 X |

OTHER PUBLICATIONS

Soap and Chemical Specialities, Oct., 1964, p. 11.

*Primary Examiner*—Herbert B. Guynn
*Attorney, Agent, or Firm*—Glenn H. Korfhage

[57] ABSTRACT

A foaming and silt suspending agent is disclosed containing at least one alkyltrimethylammonium chloride and an amine oxide selected from the group consisting of bis-(2-hydroxyethyl) cocoamine oxide, dimethylhexadecylamine oxide, and dimethyl-hydrogenated tallowamine oxide. The agent is particularly useful in a variety of aqueous based fluids of the type used in treating subterranean formations, including fluids containing other cationic additives such as certain acid inhibitors and clay stabilization agents which tend to impair the effectiveness of prior art agents.

45 Claims, No Drawings

FOAMING AND SILT SUSPENDING AGENT

BACKGROUND OF THE INVENTION

A. Field of the Invention

This invention relates to foaming and silt suspending compositions, and to a method of employing same, particularly in the context of treating subterranean formations.

B. Description of the Prior Art

Use of aqueous based stable foams in treating subterranean formations, such as in acidizing and/or fracturing to stimulate the production of oil and gas therefrom, or in well clean-up operations, has been known in the art for several years. Such foams generally contain a surfactant as an aid to generating and/or stabilizing the foam, i.e. a foaming agent.

It is also known to employ silt suspending agents in aqueous fluids for treating subterranean formations, particularly in acidizing fluids or in fluids for well cleanup immediately following an acidizing treatment, since failure to remove formation fines released during acidizing can result in decreased well productivity as a result of formation plugging and/or emulsification of the valuable formation fluids.

Silt suspending agents are generally cationic or amphoteric surfactants which provide silt suspending, water wetting, surface tension reducing, and to some extent, foaming, properties. Conventional silt suspending surfactants, however, do not perform well as foaming agents per se. On the other hand, the most efficient foaming agents of the prior art, which are generally anionic or nonionic surfactants, are not themselves sufficiently effective as silt suspending agents. Moreover, the nonionic and particularly the anionic foaming agents generally do not perform well in certain types of frequently employed aqueous based treating fluids, e.g. heavy brines, inhibited acids, and fluids containing cationic additives such as zirconium oxychloride, a frequently used clay stabilization agent.

Accordingly, a composition was sought which would be sufficiently stable to be stored, transported, and otherwise handled as a single item in inventory; which would impart both outstanding foaming and outstanding silt suspending properties to aqueous based fluids of the type suitable for use in treating subterranean formations; and which would be effective in a variety of such fluids, including fresh water, brine, acid, inhibited acid, and fluids containing other cationic additives.

SUMMARY OF THE INVENTION

A composition has now been discovered which satisfies the foregoing objectives. Accordingly, one aspect of the present invention is the composition itself, namely a blend of
 (a) at least one alkyltrimethylammonium chloride, wherein the alkyl chain length is from 8 to 18 carbon atoms and the mode, i.e. most frequently occurring, alkyl chain length is 12 or 14 carbon atoms, and
 (b) an amine oxide selected from the group consisting of bis(2-hydroxyethyl) cocoamine oxide, dimethylhydrogenated tallowamine oxide. Another aspect of the invention is a foam of the type containing an aqueous based fluid, an inert gas, and an effective amount of the blend hereinabove described to impart foaming and silt suspending properties to the foam. A further aspect of the invention is a method of treating a subterranean formation comprising injecting into the formation, an aqueous based fluid containing a foaming and silt suspending quantity of said blend.

FURTHER DESCRIPTION OF THE INVENTION

The essential components employed in the present invention are themselves known, commercially available compounds. The teachings of two Product Data Bulletins, each published in 1972 by the Aramak Chemicals Division of Akzona, Inc. of Chicago, Illinois are incorporated herein by reference, to wit: "Aromox® Amine Oxides" and "Bulletin No. 72-12, Arquad® Quaternary Ammonium Salts."

Component (a), the alkyltrimethylammonium chloride, is at least one quaternary ammonium salt of the formula

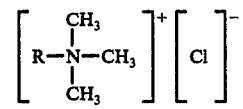

wherein R represents a long hydrocarbon chain which may vary from 8 to 18 carbon atoms. Although Component (a) may be a single quaternary compound, i.e. each R being identical, as a practical matter Component (a) will most always comprise a blend wherein the hydrocarbon chain represented by R in the foregoing formula differs from molecule to molecule. Where Component (a) is a single species, R contains 12 or 14 carbon atoms. Where Component (a) is a blend of several species, the most frequently occurring length for R in the blend is 12 or 14 carbons.

Component (a) may be provided by a commercial solution of the active ingredient in a suitable solvent, so long as the solvent is compatable with the aqueous based fluid to be foamed and with the subterranean formation at the concentration to be employed, as can readily be determined by those skilled in the art using routine laboratory procedures. A commercial product which has been satisfactorialy used as a source of Component (a) is Arquad 12-50 brand dodecyltrimethylammonium chloride, which is reported to contain, by weight, about 50% quaternary ammonium salt, about 1% sodium chloride, about 34% isopropanol, and the balance water. The quaternary ammonium salt portion of Arquad 12-50 is said to have the following alkyl moiety distribution: dodecyl (12 carbons), about 90%; tetradecyl (14 carbons), about 9%; and octadecenyl (18 carbons), about 1%.

A source of Component (a) preferred when considered from both an overall performance and economic standpoint is Arquad C-50 brand cocotrimethylammonium chloride. The commercial product is said to contain, by weight, about 50% quaternary ammonium salt, about 1% sodium chloride, about 36% isopropanol, and about 13% water. The quaternary ammonium salt portion of Arquad C-50 is said to have the following alkyl moiety distribution: octyl (8 carbons), about 8%, decyl (10 carbons), about 9%; dodecyl (12 carbons), about 47%; tetradecyl (14 carbons), about 18%; hexadecyl (16 carbons), about 8%; and octadecyl and octadecenyl (18 carbons each), about 5% each.

Compoent (b) may be any of the three amine oxides hereinabove mentioned. The amine oxide component may also be provided in a suitable solvent, such as aqueous isopropanol, if desired.

When each of Components (a) and (b) is present in the blend in significant amounts, e.g. a respective weight ratio of 1:99 to 99:1, such a blend is capable of imparting synergistic foaming and silt suspending properties to at least one of, and at many ratios and species, more than one of, the types of aqueous fluids commonly used in treating subterranean formations, e.g. fresh water, brines, acids such as hydrochloric acid, and inhibited acids. By synergism is meant that such an aqueous fluid containing an effective amount of the blend has superior properties in at least one of initial foam volume, foam half life, and silt suspending ability according to the tests hereinafter described than would be predictable from the separate performance of the amine oxide component alone and the quaternary ammonium salt alone in a comparable test on an otherwise substantially identical aqueous fluid when the separate components are each tested at a concentration in the fluid equal to that of the total concentration of the amine oxide and the quaternary ammonium salt, and which has a performance equal to or better than that which would be predictable in each of the other two test catagories.

Although synergism can be obtained in at least one of the commonly used types of treating fluids using any significant ratio of Component (a) to Component (b) in the blend, it is normally desired to employ a ratio wherein foaming properties and silt suspending properties are balanced, each at an acceptably high level, though neither may necessarily be at the optimum level attainable for that particular property in the particular aqueous treating fluid using a somewhat different ratio. It is also desirable to provide a blend which has a reasonably high level of performance in the greatest variety of fluids.

Accordingly, it is preferred that the weight ratio of Component (a) to Component (b) be from about 40:60 to about 95:5, except where Component (a) is cocotrimethyl ammonium chloride, such as that provided by the commercial product Arquad C-50 hereinabove described, and Component (b) is bis(2-hydroxyethyl) cocoamine oxide, in which case a ratio of from about 45:55 to about 85:15 is preferred. The most preferred ratios for a blend generally suited for most types of aqueous subterranean treating fluids is from about 75:25 to about 95:5, except for blends of cocotrimethyl ammonium chloride and bis(2-hydroxyethyl) cocoamine oxide, in which case a ratio of from about 60:40 to about 80:20 is most preferred.

A sufficient quantity of the blend is employed in an aqueous treating fluid to impart the desired degree of foaming and silt suspending properties to the fluid. For example, an amount which is usually sufficient is from about 0.05 to about 2 percent total alkyl trimethylammonium chloride plus amine oxide based on the total weight of the aqueous fluid to be formed. Since slightly increased corrosion may result at the higher concentrations, it is preferred to employ from about 0.1 to about 0.5 percent total Component (a) and Component (b) in the aqueous fluid to be foamed.

The novelty of the method aspects of this invention lies in the use of the particular ingredients for the stated purpose, not in the manipulative steps per se. Accordingly, foams may be generated from the blend of surfactants described herein plus an aqueous fluid to be foamed plus an inert gas in any conventional manner, either above ground, or, within the earth using as at least part of the inert gas, gas released by a phase transition, by a reaction, or by a series of reactions, occurring within the earth.

EXAMPLES AND COMPARISON RUNS

A further understanding of the invention is facilitated by the following specific runs, which are provided by way of illustration only and not as limitations of the invention.

A number of different types of tests were run using various surfactants, blends of surfactants, and aqueous fluids to be foamed. A description of each type of test follows.

Initial Foam Volume Test

Into a Waring Blendor laboratory blender was poured 100 milliliters (ml) of the aqueous fluid to be foamed. To this was added the stated quantity of surfactant blend. The mixture was gently stirred with a glass rod to insure uniform distribution of the surfactant. The blender was then operated at its high speed setting for exactly 30 seconds, as measured using a stop watch. The foam was immediately poured into a graduated cylinder, and the foam volume read in milliliters.

Foam Half-Life Test

The column of foam obtained as described above was observed and the time recorded at which the foam had deteriorated to a point such that a 50 ml layer of liquid had accumulated beneath the foam. This time period is referred to as the foam half life.

It should be noted that the data from both the Initial Foam Volume and Foam Half-Life Tests may not be quantitatively reproducible with a different blender, although the same qualitative patterns should be observable.

Silt Suspending Test

To a 100 ml ASTM pear-shaped oil tube was added 0.5 gram bentonite conforming to the following particle size distribution specifications (U.S. Sieve Series): 99–100% through 100 mesh, 90–95% through 200 mesh, and 70–77% through 325 mesh. To the tube was then added 100 ml of the fluid to be evaluated. The tube and its contents were vigorously shaken for 60 seconds and the volume of the solids which had settled at various time intervals from 1 to 30 minutes was measured.

For brevity in the Tables which follow, commercial products are identified by trademark. The compositions of Arquad C-50 and Arquad 12-50 are described above under caption III. The compositions of the Aromox brand amine oxides are as follows:

Aromox C/12 — an approximately 50 weight percent solution of bis (2-hydroxyethyl) cocoamine oxide in aqueous isopropanol Aromox DM16D—an approximately 40 weight percent solution of dimethylhexadecylamine oxide in aqueous isopropanol Aromox DMHTD—an approximately 40 percent solution of dimethyl-hydrogenated tallowamine oxide in aqueous isopropanol.

Surfactant blends were made up from various combinations of Arquad and Aromox products as shown in Table 1. Fluids were prepared by adding 1 percent by volume of each of the blends, respectively, to respective aliquots of API brine (by weight, 8% NaCl and 2.5% CaCl$_2$). The results of Initial Foam Volume Tests on the resulting fluids are tabulated in Table 1, along with the results of comparison runs not illustrative of the invention, where only one or the other of the surfactants was used. Since Arquad C-50 and 12/50, and Aromox C/12 each contain 50 weight percent active ingredients, the total of Component (a) and Component (b) in each of the brines in the test runs employing blends of those products only was approximately 0.5 weight percent. To avoid confusion, however, it should be noted that the Aromox DM16 and DMHTD products contain only 40 weight percent active ingredients, so that the total of Component (a) and Component (b) in each of the brines in the test runs employing either of those two products declined in proportionate increments from about 0.5 percent to about 0.4 percent as the ratio of Arquad to Aromox product declined.

3,634,270. Also shown in Table 3, in the figures in parentheses, are the results of Foam Half-Life tests on the same compositions.

TABLE 3

INITIAL FOAM VOLUME IN MILLILITERS AND (FOAM HALF-LIFE IN SECONDS) OF VARIOUS FLUIDS With 1% OF ARQUAD/AROMOX BLENDS

| Arquad Product | C-50 | C-50 | 12/50 | C-50 | 12/50 | C-50 | 12/50 |
|---|---|---|---|---|---|---|---|
| Aromox Product | C/12 | C/12 | C/12 | DM16D | DM16D | DMHTD | DMHTD |
| Aqueous Treating Fluid | 75:25* | 90:10 | 90:10 | 90:10 | 90:10 | 90:10 | 90:10 |
| 15% HCl + 0.3% Inhibitor 2 | 360 (250) | 380 (287) | 370 (283) | 350 (222) | 375 (280) | 355 (232) | 360 (268) |
| 15% HCl + 0.3% Inhibitor 1 | 330 (220) | 310 (180) | 310 (205) | 300 (132) | 310 (194) | 315 (165) | 325 (194) |
| 3% HCl + 0.3% Inhibitor 2 | 400 (250) | 360 (210) | 425 (255) | 380 (202) | 400 (253) | 335 (160) | 400 (255) |
| 3% HCl + 0.3% Inhibitor 1 | 360 (208) | 360 (135) | 350 (195) | 315 (118) | 355 (191) | 295 (110) | 360 (200) |
| 2% KCl | 522 (312) | 545 (317) | 540 (297) | 510 (310) | 560 (272) | 545 (294) | 550 (277) |
| 2% KCl + 2% a 20% soln. of zirconium oxychloride | 550 (303) | 545 (300) | 525 (290) | 565 (290) | 595 (268) | 550 (294) | 585 (264) |
| 2% CaCl₂ | 560 (305) | 530 (310) | 520 (300) | 515 (305) | 550 (283) | 540 (293) | 545 (275) |
| 2% CaCl₂ + 2% a 20% soln. of zirconium oxychloride | 525 (309) | 515 (295) | 525 (283) | 535 (306) | 550 (280) | 540 (294) | 545 (278) |

*Arquad:Aromox volume ratio

Foam screening tests were conducted using literally hundreds of different commercially available surfactants in distilled water. Approximately ten percent of those tested in fresh water were selected for additional testing in API brine and in hydrochloric acid. Among the most satisfactory commercial products was a nonionic surfactant containing a sulfated, ethoxylated linear alcohol, an alkanolamine, a fatty acid amide, and a fatty ester, identified in the following tables as Comparison Surfactant 1. (Comparison runs with two other surfactants which performed well in the initial tests were not

TABLE 1

INITIAL FOAM VOLUME OF API BRINE

| Volume Ratio in Blend Arquad:Aromox | Arquad C-50 Aromox C/12 | Arquad C-50 Aromox DM16D | Arquad C-50 Aromox DMHTD | Arquad 12/50 Aromox C/12 | Arquad 12/50 Aromox DM16D | Arquad 12/50 Aromox DMHTD |
|---|---|---|---|---|---|---|
| 100:0 | 445 | 445 | 445 | 430 | 430 | 430 |
| 90:10 | 425 | 455 | 450 | 440 | 465 | 465 |
| 75:25 | 450 | 405 | 430 | 435 | 440 | 455 |
| 50:50 | 425 | 350 | 380 | 430 | 395 | 425 |
| 25:75 | 355 | 315 | 290 | 350 | 340 | 310 |
| 0:100 | 370 | 235 | 220 | 370 | 235 | 220 |

A similar series of tests was run using 1 volume percent of the blend of commercial products in 15 weight percent hydrochloric acid. Results are tabulated in Table 2.

carried further when it was found both performed poorly in inhibited acids.) Table 4 shows the Initial Foam Volume and, in parentheses, the Foam Half-Life of various fluids containing, respectively, 1 percent by

TABLE 2

INITIAL FOAM VOLUME OF 15% HCl

| Volume Ratio in Blend, Arquad:Aromox | Arquad C-50 Aromox C/12 | Arquad C-50 Aromox DM16D | Arquad C-50 Aromox DMHTD | Arquad 12/50 Aromox C/12 | Arquad 12/50 Aromox DM16D | Arquad 12/50 Aromox DMHTD |
|---|---|---|---|---|---|---|
| 100:0 | 415 | 415 | 415 | 410 | 410 | 410 |
| 90:10 | 430 | 445 | 420 | 425 | 440 | 425 |
| 75:25 | 435 | 415 | 375 | 420 | 420 | 410 |
| 50:50 | 410 | 365 | 320 | 415 | 365 | 330 |
| 25:75 | 400 | 205 | 215 | 395 | 305 | 250 |
| 0:100 | 360 | 175 | 175 | 360 | 175 | 175 |

Table 3 shows the results of Initial Foam Volume tests on various types of fluids commonly used of treating subterranean formations containing one volume percent of the blend of Arquad and Aromox products in the ratios indicated. In Table 3 and those which follow, "Inhibitor 1" refers to an inhibitor of the type disclosed in U.S. Pat. No. 3,077,454 and "Inhibitor 2" refers to an inhibitor of the type disclosed in U.S. Pat. No.

volume of Comparison Surfactant 1 or a blend of the present invention comprising a 75:25 blend, by the volume of Arquad C-50 and Aromox C/12.

TABLE 4

INITIAL FOAM HEIGHT IN MILLILITERS AND (FOAM HALF-LIFE IN SECONDS) OF VARIOUS FLUIDS WITH 1% OF 75:25 BLEND OF ARQUAD C-50 AND AROMOX C/12 VERSUS 1% OF COMPARISON SURFACTANT 1

| Aqueous Testing Fluid | Arquad/Aromox Blend | Comparison Surfactant 1 |
|---|---|---|
| 15% HCl + 0.3% Inhibitor 2 | 360 (250) | 300 (160) |
| 15% HCl + 0.3% Inhibitor 1 | 330 (220) | 285 (120) |
| 3% HCl + 0.3% Inhibitor 2 | 400 (250) | 275 (200) |
| 3% HCl + 0.3% Inhibitor 1 | 360 (208) | 345 (125) |
| 2% KCl | 522 (312) | 505 (302) |
| 2% KCl + 2% a 20% solution of zirconium oxychloride | 550 (303) | 310 (135) |
| 2% CaCl$_2$ | 560 (305) | 490 (305) |
| 2% CaCl$_2$ + 2% a 20% solution of zirconium oxychloride | 525 (309) | 310 (135) |
| API Brine | 450 (340) | 395 (260) |
| API Brine + 2% a 20% solution of zirconium oxychloride | 430 (320) | 370 (210) |
| Fresh Water | 610 | 575 |
| | (380) | (345) |
| Simulated spend acid, i.e. 20.4% CaCl$_2$ | 410 (471) | 380 (325) |

The two blends for which results were reported in Table 4 for runs at a 1% concentration were run at various concentrations in an aqueous solution containing 2% KCl and 2% of a 20% solution of zirconium oxychloride. The results are tabulated in Table 5.

TABLE 5

INITIAL FOAM HEIGHT IN MILLILITERS AND (FOAM HALF-LIFE IN SECONDS) OF AN AQUEOUS SOLUTION OF 2% KCl AND 2% A 20% SOLUTION OF ZIRCONIUM OXYCHLORIDE WITH VARIOUS CONCENTRATIONS OF A 75:25 BLEND OF ARQUAD C-50 AND AROMOX C/12 VERSUS SAME CONCENTRATIONS OF COMPARISON SURFACTANT 1

| Concentration | Arquad/Aromox Blend | Comparison Surfactant 1 |
|---|---|---|
| 0.1% | 270 (120) | 170 (20) |
| 0.2% | 315 (171) | 200 (45) |
| 0.5% | 435 (317) | 265 (80) |
| 1.5% | 648 (305) | 335 (205) |
| 2.0% | 738 (300) | 395 (250) |

Silt suspending tests were conducted with various surfactants, including a 75:25 blend of Arquad C-50 and Aromox C/12, using a 15% hydrochloric acid solution containing 0.6% Inhibitor 2, and using a solution of 24.4% calcium chloride to simulate spent acid. Each surfactant formulation was employed in an amount equal to 1 volume percent of the total treating fluid. Results of these tests were tabulated in Table 6.

TABLE 6

VOLUME OF SILT SETTLED AS A FUNCTION OF TIME FOR VARIOUS SURFACTANT FORMULATIONS IN INHIBITED ACID AND SIMULATED SPENT ACID

| Time Minutes | Arquad/Aromox Blend | Arquad C-50 Alone | Aromox C-12 Alone | Comparison Surfactant 1 | Comparison Surfactant 2* | Comparison Surfactant 3** |
|---|---|---|---|---|---|---|
| Live Acid System: | | | | | | |
| 1 | 0.2 | 0.2 | 0.3 | 0.2 | 0.2 | 0.2 |
| 2 | 0.3 | 0.3 | 0.5 | 0.5 | 0.2 | 0.3 |
| 3 | 0.4 | 0.4 | 0.6 | 0.7 | 0.4 | 0.4 |
| 4 | 0.5 | 0.5 | 0.6 | 0.7 | 0.5 | 0.5 |
| 5 | 0.5 | 0.5 | 0.7 | 0.8 | 0.6 | 0.5 |
| 10 | 0.6 | 0.6 | 0.8 | 1.1 | 0.8 | 0.8 |
| 20 | 0.7 | 0.7 | 0.9 | 1.2 | 0.9 | 0.9 |
| 30 | 0.8 | 0.8 | 1.0 | 1.3 | 0.9 | 0.9 |
| Spend Acid System: | | | | | | |
| 1 | 0.2 | 0.2 | 0.2 | 0.1 | <0.1 | 0.1 |
| 2 | 0.3 | 0.4 | 0.3 | 0.2 | 0.1 | 0.2 |
| 3 | 0.3 | 0.5 | 0.5 | 0.3 | 0.2 | 0.3 |
| 4 | 0.4 | 0.6 | 0.6 | 0.5 | 0.3 | 0.4 |
| 5 | 0.4 | 0.7 | 0.7 | 0.6 | 0.3 | 0.5 |
| 10 | 0.5 | 0.8 | 0.9 | 2.3 | 0.7 | 0.7 |
| 20 | 0.6 | 1.0 | 1.1 | 2.3 | 0.8 | 0.9 |
| 30 | 0.7 | 1.1 | 1.2 | 2.3 | 1.0 | 1.1 |

Note
*An aqueous alcoholic solution of N-alkyl beta-amino propionates.
**Dialkanol fatty amide and glycol fatty ester blend.

Thus, Comparison Surfactant 1, although fairly satisfactory, was nevertheless inferior to the blend of the present invention in both silt suspending and foaming properties. Comparison Surfactant 2, a fairly good silt suspending agent, did not exhibit good foaming properties, generating, for example, an Initial Foam Volume of only 425 ml in fresh water, compared to 610 ml using the 75:25 Arquad C-50:Aromox C/12 blend. Similarly, Comparison Surfactant 3 was not an adequate foaming agent, generating only 195 ml foam in the fresh water test hereinabove described.

Silt suspension test were also run using different concentrations of the 75:25 Arquad C-50:Aromox C/12 blend and Comparison Surfactant 2 on fluids substantially identical to those used for the runs tubulated in Table 6. Results of these tests, tabulated in Table 7 show that the silt suspending superiority of the Arquad-:Aromox blend over Comparison Surfactant 2 is even more apparent at lower concentrations.

TABLE 7

VOLUME OF SILT SETTLED AS A FUNCTION OF TIME FOR SURFACTANT FORMULATIONS AT VARIOUS CONCENTRATIONS IN INHIBITED ACID

TABLE 7-continued

AND SIMULATED SPENT ACID

| Time (Minutes) | No Surfactant | 0.1 Volume Percent | | 0.2 Volume Percent | | 0.5 Volume Percent | |
|---|---|---|---|---|---|---|---|
| | | A/A Blend* | CS2** | A/A Blend | CS2 | A/A Blend | CS2 |
| Live Acid System: | | | | | | | |
| 1 | 2.0 | 1.0 | 1.5 | 0.5 | 1.2 | 0.5 | 0.7 |
| 2 | 3.3 | 1.2 | 2.4 | 0.9 | 1.6 | 0.7 | 0.9 |
| 3 | 4.4 | 1.7 | 2.9 | 1.2 | 1.7 | 0.7 | 1.0 |
| 4 | 4.7 | 2.0 | 3.1 | 1.3 | 1.8 | 0.8 | 1.0 |
| 5 | 4.7 | 2.1 | 3.1 | 1.4 | 1.8 | 0.8 | 1.1 |
| 10 | 4.7 | 2.2 | 3.1 | 1.4 | 1.8 | 0.9 | 1.1 |
| 20 | 4.7 | 2.3 | 3.1 | 1.5 | 1.8 | 0.9 | 1.2 |
| 30 | 4.7 | 2.3 | 3.1 | 1.5 | 1.9 | 0.9 | 1.3 |
| Spent Acid System: | | | | | | | |
| 1 | 0.2 | 0.3 | 0.3 | 0.3 | 0.2 | 0.2 | 0.2 |
| 2 | 0.6 | 0.5 | 0.6 | 0.4 | 0.5 | 0.4 | 0.4 |
| 3 | 1.0 | 0.7 | 0.9 | 0.5 | 0.6 | 0.5 | 0.5 |
| 4 | 1.3 | 0.9 | 1.3 | 0.6 | 1.0 | 0.6 | 0.6 |
| 5 | 1.4 | 1.0 | 1.4 | 0.7 | 1.1 | 0.7 | 0.7 |
| 10 | 1.6 | 1.1 | 1.5 | 0.9 | 1.2 | 0.8 | 0.8 |
| 20 | 1.7 | 1.2 | 1.5 | 1.0 | 1.3 | 0.9 | 1.0 |
| 30 | 1.8 | 1.3 | 1.5 | 1.1 | 1.4 | 1.0 | 1.1 |

Note
*75:25 Arquad C:50:Aromox C/12 blend
**Comparison Surfactant 2

As an illustration of a field use, a well in Coshocton County, Ohio was treated with a clay stabilizing solution of zirconium oxychloride. A conventional gelled aqueous fracturing fluid containing sand as a proppant was then injected until a fracture was achieved. Thereafter, the well was flushed with approximately 250 barrels of an aqueous fluid containing 30 gallons of a blend of 75 parts by volume Arquad C-50 surfactant and 25 parts Aromox C/12 surfactant. Well clean-up was quickly completed with excellent results.

What is claimed is:

1. A composition suitable for imparting foaming and silt suspending properties to aqueous based fluids of the type suitable for use in treating subterranean formations, comprising a blend of:
   (a) at least one alkyltrimmethylammonium chloride, wherein the alkyl chain length is from 8 to 18 carbon atoms and the mode alkyl chain length is 12 or 14 carbon atoms, and
   (b) an amine oxide selected from the group consisting of bis(2-hydroxyethyl) cocoamine oxide, dimethylhexadecylamine oxide, and dimethyl-hydrogenated tallowamine oxide, wherein
   Component (a) and Component (b) are in a weight ratio to one another of
      (i) from about 45:55 to about 85:15 when Component (a) is cocotrimethyl ammonium chloride and Component (b) is bis(2-hydroxyethyl) cocoammine oxide, and
      (ii) from about 40:60 to about 95:5 when said Components (a) and (b) are selected so as to provide a combination other than cocotrimethyl ammonium chloride and bis(2-hydroxyethyl) cocoamine oxide.

2. The composition of claim 1 wherein Component (a) is cocotrimethyl ammonium chloride, Component (b) is bis(2-hydroxyethyl) cocamine oxide, and Components (a) and (b) are in a weight ratio to one another of from about 45:55 to about 85:15.

3. The composition of claim 2 wherein Components (a) and (b) are in a weight ratio to one another of from about 60:40 to about 80:20.

4. The composition of claim 3 containing, in addition, isopropanol.

5. The composition of claim 1 wherein Components (a) and (b) are in a weight ratio of from about 40:60 to about 95:5 and Components (a) and (b) are selected so as to provide a combination other than cocotrimethyl ammonium chloride with bis(2-hydroxyethyl) cocoamine oxide.

6. The composition of claim 5 wherein Components (a) and (b) are in a weight ratio of from about 75:25 to about 95:5.

7. The composition of claim 1 wherein Component (a) is a blend of quaternary ammonium chlorides characterized by the following alkyl moiety distribution: dodecyl, about 90%, tetradecyl, about 9%; and octadecenyl, about 1%.

8. The composition of claim 1 wherein Component (a) is a blend of quaternary ammonium chlorides characterized by the following alkyl moiety distribution: octyl, about 8%; decyl, about 9%; dodecyl, about 47%; tetradecyl, about 18%; hexadecyl, about 8%; octadecyl, about 5%; and octadecenyl, about 5 percent.

9. The composition of claim 8 wherein Component (b) is bis(2-hydroxyethyl) cocoamine oxide.

10. A foam comprised of an aqueous based fluid, an inert gas, and a blend of
   (a) at least one alkyltrimethylammmonium chloride, wherein the alkyl chain length is from 8 to 18 carbon atoms and the mode alkyl chain length is 12 or 14 carbon atoms,
   (b) an amine oxide selected from the group consisting of bis(2-hydroxyetyl) cocoamine oxide, dimethylhexadecylamine oxide, and dimethyl-hydrogenated tallowamine oxide, said blend being present in an amount effective to impart foaming and silt suspending properties to said aqueous based fluid, wherein Components (a) and (b) are in a synergistic weight ratio to one another within the range of
      (i) from about 45:55 to about 85:15 when Component (a) is cocotrimethyl ammonium chloride and Component (b) is bis(2-hydroxyethyl) cocoamine oxide, and
      (ii) from about 40:60 to about 95:5 when said Components (a) and (b) are selected so as to provide a combination other than cocotrimethyl ammonium chloride and bis(2-hydroxyethyl) cocoamine oxide.

11. The foam of claim 10 wherein the aqueous based fluid is a brine.

12. The foam of claim 11 wherein Component (a) is cocotrimethyl ammonium chloride, Component (b) is bis(2-hydroxyethyl) cocoamine oxide, and Components (a) and (b) are in a weight ratio to one another of from about 60:40 to about 80:20.

13. The foam of claim 12 containing in addition, isopropanol.

14. The foam of claim 13 wherein Components (a) and (b) are present in a total amount of from about 0.05 to about 2 percent, based on the weight of the fluid to be foamed.

15. The foam of claim 14 wherein Components (a) and (b) are present in a total amount of from about 0.1 to about 0.5 percent, based on the weight of the fluid to be foamed.

16. The foam of claim 10 wherein Components (a) and (b) are in a weight ratio of from about 75:25 to about 95:5 and Componets (a) and (b) are selected so as to provide a combination other than cocotrimethyll ammoniumm chloride with bis(2-hydroxyethyl) cocoamine oxide.

17. The foam of claim 10 wherein Component (a) is a blend of quaternary ammonium chlorides characterized by the following alkyl moiety distribution: dodecyl, about 90%; tetradecyl, about 9%; and octadecenyl, about 1%.

18. The foam of claim 10 wherein Component (a) is blend of quaternary ammonium chlorides characterized by the following alkyl moiety distribution: octyl, about 8%; decyl, about 9%; dodecyl, about 47%; tetradecyl, about 18%; hexadecyl, about 8%; octadecyl, about 5%; and octadecenyl, about 5 percent.

19. The foam of claim 18 wherein Component (b) is bis(2-hydroxyethyl) cocoamine oxide.

20. The foam of claim 10 wherein Components (a) and (b) are present in a total amount of from about 0.05 to about 2 percent, based on the weight of aqueous based fluid.

21. The foam of claim 20 wherein Components (a) and (b) are present in a total amount of from about 0.1 to about 0.5 percent, based on the weight of the aqueous based fluid.

22. The foam of claim 10 wherein the aqueous based fluid is fresh water.

23. The foam of claim 10 wherein the aqueous based fluid is an acid.

24. The foam of claim 25 wherein the aqueous based fluid is inhibited hydrochloric acid.

25. The foam of claim 10 wherein the aqueous based fluid is a spent acid.

26. The foam of claim 10 wherein the aqueous based fluid contains zirconium oxychloride as a clay stabilization agent.

27. A method of acidizing or fracturing a subterranean formation penetrated by a borehole, comprising injecting into the formation via the borehole so that said formation is acidized or fractured, an aqueous based acidizing or fracturing fluid containing a foaming and silt suspending quantity of a blend of
 (a) at least one alkyltrimethylammonium chloride, wherein the alkyl chain length is from 8 to 18 carbon atoms and the mode alkyl chain length is 12 or 14 carbon atoms, and
 (b) an amine oxide selected from the group consisting of bis(2-hydroxyethyl) cocoamine oxide, dimethyl-hexadecylamine oxide, and dimethyl-hydrogenated tallowamine oxide, wherein Components (a) and (b) are in a synergistic weight ratio to one another of (i) from about 45:55 to about 85:15 when Component (a) is cocotrimethyl ammonium chloride and Component (b) is bis(2-hydroxyethyl) cocoammine oxide, and
 (ii) from about 40:60 to about 95:5 when said Components (a) and (b) are selected so as to provide a combination other than cocotrimethyl ammonium chloride and bis(2-hydroxyethyl) cocoamine oxide,
said fluid being admixed with an inert gas to form a foam.

28. The method of claim 27 wherein Component (a) is cocotrimethyl ammonium chloride, Component (b) is bis(2-hydroxyethyl) cocoamine oxide, and Components (a) and (b) are in a weight ratio to one another of from about 60:40 to about 80:20.

29. The method of claim 28 containing, in addition, isopropanol.

30. The method of claim 29 wherein Components (a) and (b) are present in a total amount of from about 0.05 to about 2 percent, based on the weight of the aqueous based fluid.

31. The method of claim 30 wherein Components (a) and (b) are present in a total amount of from about 0.1 to about 0.5 percent, based on the weight of the aqueous based fluid.

32. The method of claim 27 wherein Components (a) and (b) are in a weight ratio of from about 75:25 to about 95:5 and Components (a) and (b) are selected so as to provide a combination other than cocotrimethyl ammonium chloride with bis(2-hydroxyethyl) cocoamine oxide.

33. The method of claim 27 wherein Component (a) is a blend of quaternary ammonium chlorides characterized by the following alkyl moiety distribution: dodecyl, about 90%; tetradecyl, about 9%; and octadecenyl, about 1%.

34. The method of claim 27 wherein Component (a) is a blend of quaternary ammonium chlorides characterized by the following alkyl moiety distribution: octyl, about 8%; decyl, about 9%; dodecyl, about 47%; tetradecyl, about 18%; hexadecyl, about 8%; octadecyl, about 5%; and octadecenyl, about 5 percent.

35. The method of claim 34 wherein Component (b) is bis(2-hydroxyethyl) cocoamine oxide.

36. The method of claim 27 wherein Components (a) and (b) are presennt in a total amount of from about 0.05 to about 2 percent, based on the weight of the aqueous based fluid.

37. The method of claim 36 wherein Components (a) and (b) are present in a total amount of from about 0.1 to about 0.5 percent, based on the weight of the aqueous based fluid.

38. The method of claim 27 wherein the aqueous based fluid is fresh water.

39. The method of claim 27 wherein the aqueous based fluid is an acid.

40. The method of claim 39 wherein the aqueous based fluid is inhibited hydrochloric acid.

41. The method of claim 27 where in the aqueous based fluid is a brine.

42. The method of claim 27 wherein the aqueous based fluid and the blend are admixed with an inert gas to form a foam prior to injection into the borehole.

43. The method of claim 42 which includes a subsequent step of removing at least a portion of the injected fluid from the borehole after said portion has contacted the formation.

44. The method of claim 27 wherein the aqueous based fluid and the blend are admixed with an inert gas subsequent to injection into the borehole to form a foam in situ.

45. The method of claim 44 including a subsequent step of removing at least a portion of said injected fluid from the borehole after said portion has contacted the formation.

* * * * *